United States Patent
Jensen et al.

(10) Patent No.: US 10,766,531 B2
(45) Date of Patent: Sep. 8, 2020

(54) STEERING SENSOR PIN ASSEMBLY

(71) Applicant: CNH Industrial America LLC, New Holland, PA (US)

(72) Inventors: Michael Jensen, Lockport, IL (US); Jie Tu, Hinsdale, IL (US)

(73) Assignee: CNH Industrial America LLC, New Holland, PA (US)

( * ) Notice: Subject to any disclaimer, the term of this patent is extended or adjusted under 35 U.S.C. 154(b) by 183 days.

(21) Appl. No.: 16/119,613

(22) Filed: Aug. 31, 2018

(65) Prior Publication Data

US 2020/0070885 A1 Mar. 5, 2020

(51) Int. Cl.
*B62D 15/02* (2006.01)
*B62D 7/18* (2006.01)

(52) U.S. Cl.
CPC ............. *B62D 15/023* (2013.01); *B62D 7/18* (2013.01); *B62D 15/02* (2013.01); *B60G 2204/11* (2013.01); *B60G 2400/41* (2013.01)

(58) Field of Classification Search
CPC ........ B62D 15/023; B62D 15/02; B62D 7/18; B60G 2204/11; B60G 2400/41
USPC .............................. 280/93.5, 93.501, 93.512
See application file for complete search history.

(56) References Cited

U.S. PATENT DOCUMENTS

| | | | |
|---|---|---|---|
| 1,992,065 A | 2/1935 | Grainger | |
| 2,094,945 A | 10/1937 | Hesselrode | |
| 3,980,151 A | 9/1976 | Murayama et al. | |
| 6,293,022 B1 * | 9/2001 | Chino | B62D 15/023 33/203.18 |
| 6,579,026 B2 | 6/2003 | Moses et al. | |
| 9,796,423 B2 | 10/2017 | Lavilluniere | |
| 2019/0367091 A1 * | 12/2019 | Hershbarger | A01D 41/141 |

FOREIGN PATENT DOCUMENTS

| | | | | |
|---|---|---|---|---|
| CA | 2290474 A1 | * | 11/1998 | ........... B62D 15/023 |
| CN | 102616276 A | | 8/2012 | |
| DE | 10 2011 017 150 A1 | | 10/2012 | |
| DE | 10 2012 107 391 A1 | | 2/2014 | |
| JP | 10310077 A | * | 11/1998 | ........... B62D 15/023 |
| JP | 10311738 A | * | 11/1998 | ........... B62D 15/023 |
| JP | 11023207 A | * | 1/1999 | |
| JP | 2001334953 A | * | 12/2001 | ........... B62D 15/023 |
| JP | 2004106564 A | * | 4/2004 | |
| JP | 3999702 B2 | * | 10/2007 | |
| JP | 2016-2972 A | | 1/2016 | |

* cited by examiner

*Primary Examiner* — Keith J Frisby
(74) *Attorney, Agent, or Firm* — Rickard K. DeMille; Rebecca L. Henkel

(57) ABSTRACT

An agricultural vehicle including a front axle assembly having an axle beam with a slot, a wheel assembly including a steering knuckle coupled to a wheel flange assembly, and a steering sensor pin assembly is provided. The steering sensor pin assembly includes a steering sensor pin having a first end and a second end opposite the first end having a flat face, and a kingpin connected to the steering knuckle. The kingpin has a top surface, a bottom surface, and a hole from the top surface to the bottom surface. The hole is aligned with the slot in the axle beam, and the steering sensor pin is positioned in the hole for coupling the kingpin to the axle beam via the flat face of the steering sensor pin being coupled to the slot.

13 Claims, 4 Drawing Sheets

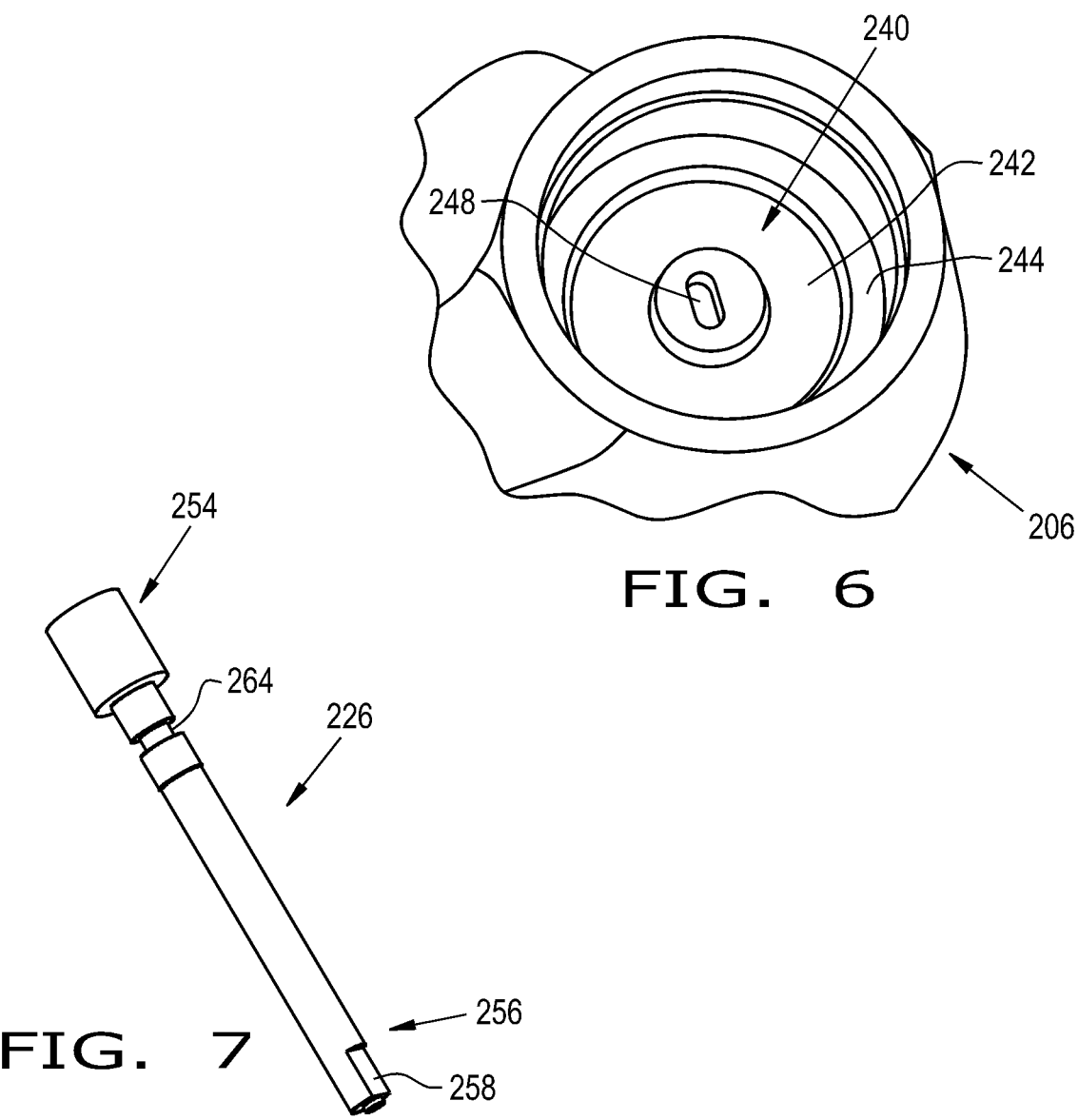
FIG. 6
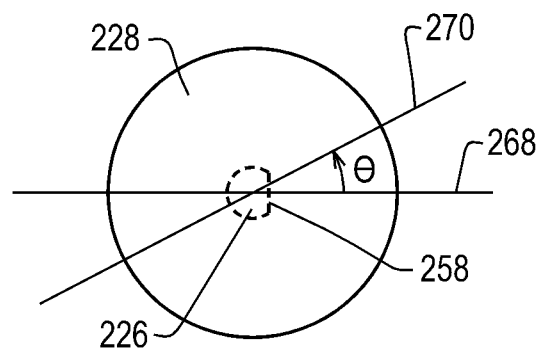
FIG. 7
FIG. 8

STEERING SENSOR PIN ASSEMBLY

BACKGROUND OF THE INVENTION

1. Field of the Invention

The present invention relates to steering sensors, and, more particularly, to steering sensor pin assemblies for front axles of tractors.

2. Description of the Related Art

Steering sensor pin assemblies form a component of the steering system of vehicles. Steering sensor pin assemblies provide a mechanical linkage, and in some instances an electrical linkage, between the tie rods of the front axle and the steering knuckles that are coupled to the wheel flanges of the front wheels. The mechanical linkage enables the operator of the vehicle to steer the vehicle, and the electrical linkage provides signals that reference the amount of rotation of a kingpin of the steering assembly about a steering sensor pin of the steering assembly that may be used to monitor an operator's steering input, such as the steering wheel angle, a rate that the driver turns the steering wheel, and/or an amount of rotation of the front wheels. A stability control system can use the information to enhance braking, handling and traction as driving conditions change. For example, a variable-assist power steering system can use the information to vary hydraulic pressure and an electronic suspension system can use the information to adjust parameters of the system, such as damping rate of the suspension system, for example.

FIG. 1 is a conventional steering sensor pin assembly 100, according to the prior art. The conventional steering sensor pin assembly 100 includes a kingpin 102 that is connected to a steering knuckle 104. A tie rod (not shown) is also typically coupled to the steering knuckle 104. The kingpin 102 is also connected to a front axle beam 106 via a threaded steering sensor pin 108. As illustrated, the front axle beam 106 has a threaded through-hole 110 into which the threaded steering sensor pin 108 is threaded for securing the kingpin 102 to the front axle beam 106. More specifically, the kingpin 102 has a through-hole 112 that is aligned with the through-hole 110 of the front axle beam 106, into which the steering sensor pin 108 is inserted for coupling the kingpin 102 to the front axle beam 106 via the threads of the through-hole 110 and the pin 108. A locking nut 114 is threaded onto the portion of the pin 108 that exists the through-hole 110, thereby securely fastening the kingpin 102 to the front axle beam 106.

One problem with the conventional steering sensor pin assembly 100 is that it is susceptible to leaks of grease or other lubricants used to lubricate the pin 108 positioned in the hole 112 for enabling the rotation of the kingpin 102 about the pin 108. The leaks occur via the threaded through-hole 110 formed in the front axle beam 106.

Another problem with the conventional steering sensor pin assembly 100 is that during manufacture, or replacement of the steering sensor pin assembly, the steering sensor pin 108 must be correctly oriented (i.e., calibrated) with respect to a steering sensor 116 that is mounted to the kingpin 102 to enable the steering sensor 116 to indicate the correct amount of rotation of the kingpin 102 about the steering sensor pin 108. The calibration procedure is time-consuming. For example, calibration requires screwing the steering sensor pin 108 down into the threaded through-hole 110 formed in the beam 106 and continually re-adjusting the position of the steering sensor pin 108 in the through-hole 110 until the signal from the steering sensor 116 indicates the correct angle of rotation of the kingpin 102 about the steering sensor pin 108, and then locking the pin 108 to remain in the determined proper orientation in the threaded through-hole 110 via the locking nut 114, while attempting to keep the pin 108 from rotating while threading the locking nut 114 onto the end of the threaded pin 108.

What is needed in the art is a steering sensor pin assembly that addresses the above-discussed problems.

SUMMARY OF THE INVENTION

In accordance with an aspect of the present invention, an agricultural vehicle includes a front axle assembly having an axle beam with a slot, a wheel assembly including a steering knuckle coupled to a wheel flange assembly, and a steering sensor pin assembly. The steering sensor pin assembly includes a steering sensor pin having a first end and a second end opposite the first end having a flat face, and a kingpin connected to the steering knuckle. The kingpin has a top surface, a bottom surface, and a hole from the top surface to the bottom surface. The hole is aligned with the slot in the axle beam, and the steering sensor pin is positioned in the hole for coupling the kingpin to the axle beam via the flat face of the steering sensor pin being coupled to the slot.

In accordance with another aspect of the present invention, the agricultural vehicle is a tractor.

An advantage of the present invention is to provide a steering sensor pin assembly that eliminates the risk of lubricant leaking from the steering sensor pin assembly through an axle beam to which it is connected.

Another advantage of the present invention is to provide a steering sensor pin assembly having a steering sensor and a steering sensor pin that requires no extensive and time-consuming calibration of the steering sensor with respect to the steering sensor pin.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 6 shows the axle beam of FIG. 5, according to an embodiment of the present invention;

FIG. 7 shows the steering sensor pin of FIG. 5, according to an embodiment of the present invention; and FIG. 8 depicts a view looking down along the longitudinal axis of the hole of FIG. 5 showing an angle of rotation between the steering sensor and the steering sensor pin, according to an embodiment of the present invention.

Corresponding reference characters indicate corresponding parts throughout the several views. The exemplifications set out herein illustrate embodiments of the invention, and such exemplifications are not to be construed as limiting the scope of the invention in any manner

DETAILED DESCRIPTION OF THE INVENTION

The terms "fore", "aft", "left" and "right", when used in connection with a vehicle assembly or components thereof are usually determined with reference to the direction of forward operative travel of the vehicle assembly, but they should not be construed as limiting. The terms "longitudinal" and "transverse" may be determined with reference to the fore-and-aft direction of the vehicle assembly or may be determined with respect to longitudinal and transverse directions of components of the vehicle assembly, however they are equally not to be construed as limiting.

Figure 1:
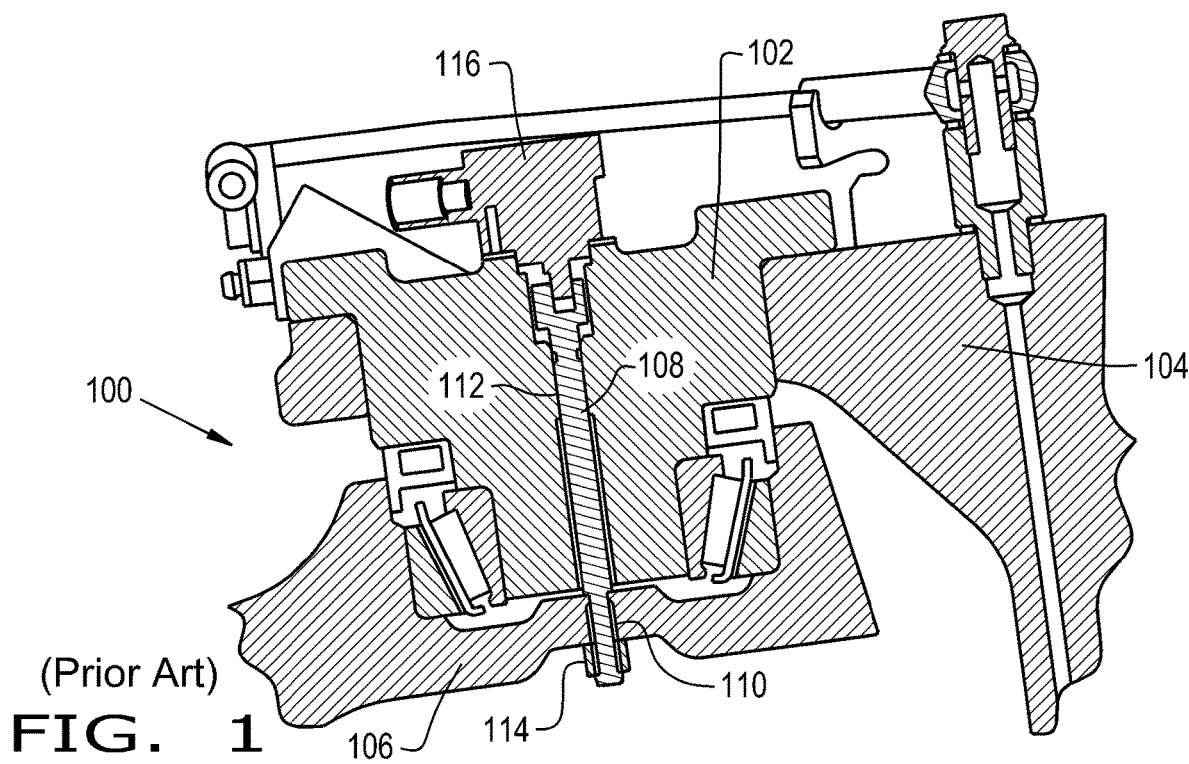
FIG. 1 is a conventional steering sensor pin assembly, according to the prior art.
Figure 2:
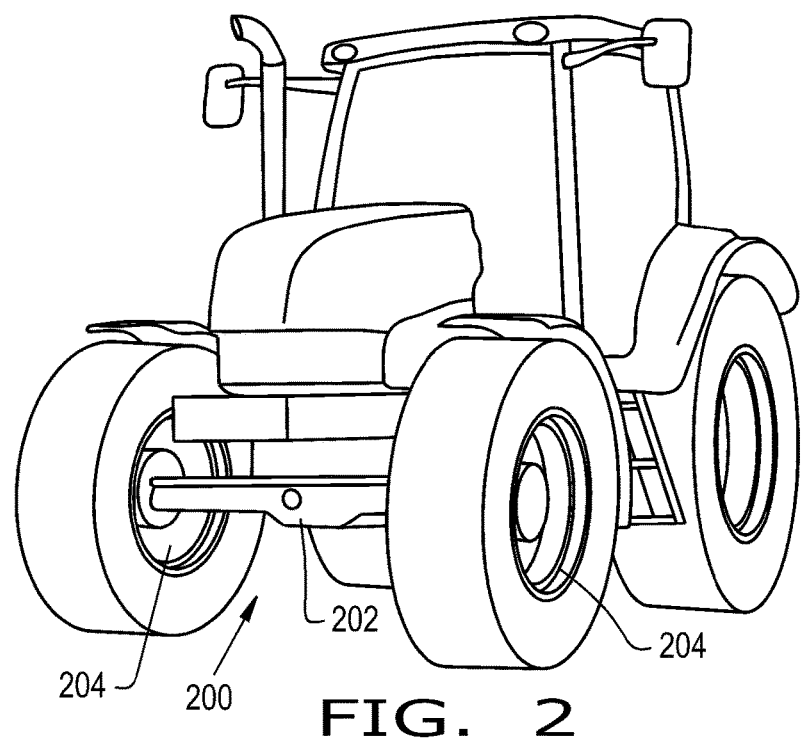
FIG. 2 is exemplary embodiment of an agricultural vehicle in the form of a tractor, according to an embodiment of the present invention.

Referring now to the drawings, and more particularly to FIG. 2, there is shown an exemplary embodiment of an agricultural vehicle 200 in the form of a tractor, according to an embodiment of the invention. The tractor 200 includes a front axle assembly 202 to which the front wheels 204 are mounted.

Figure 3:
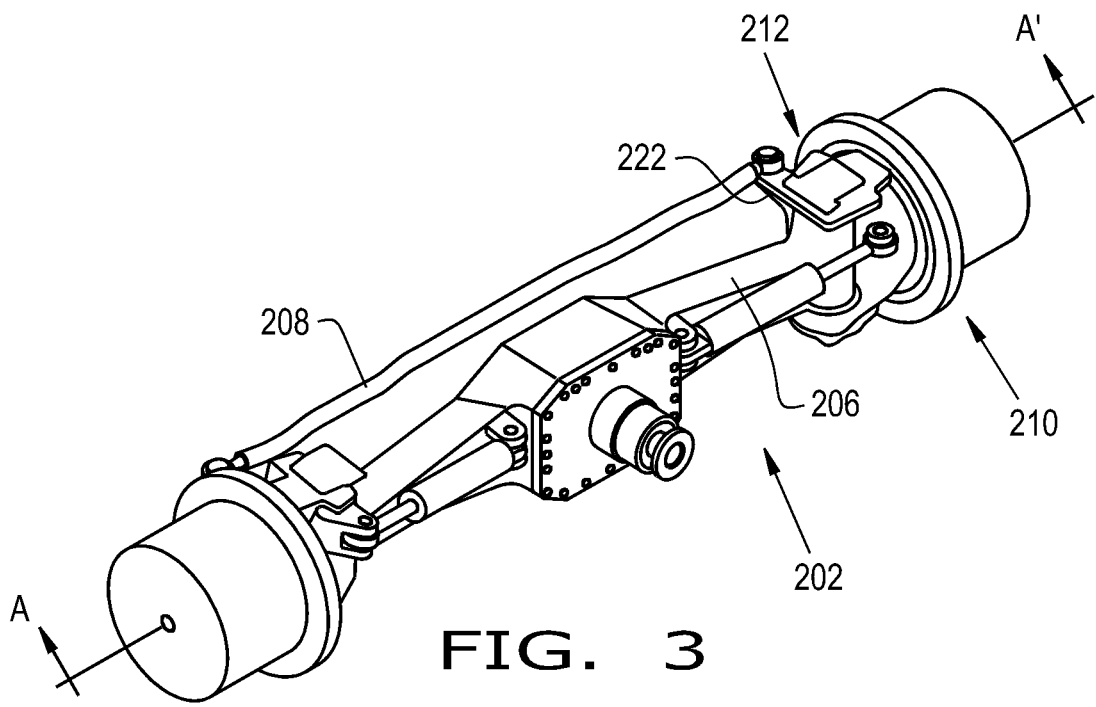
FIG. 3 shows the front axle assembly of FIG. 2, according to an embodiment of the present invention.

FIG. 3 shows the front axle assembly 202 of FIG. 2, according to an embodiment of the invention. The front axle assembly 202 includes an axle beam 206 and at least one tie rod 208, a wheel assembly 210, and a steering sensor pin assembly 212. The components and the structural and functional relationships between the components of the front axle assembly 202 will be discussed in more detail further below in conjunction with FIGS. 4-8.

Figure 4:
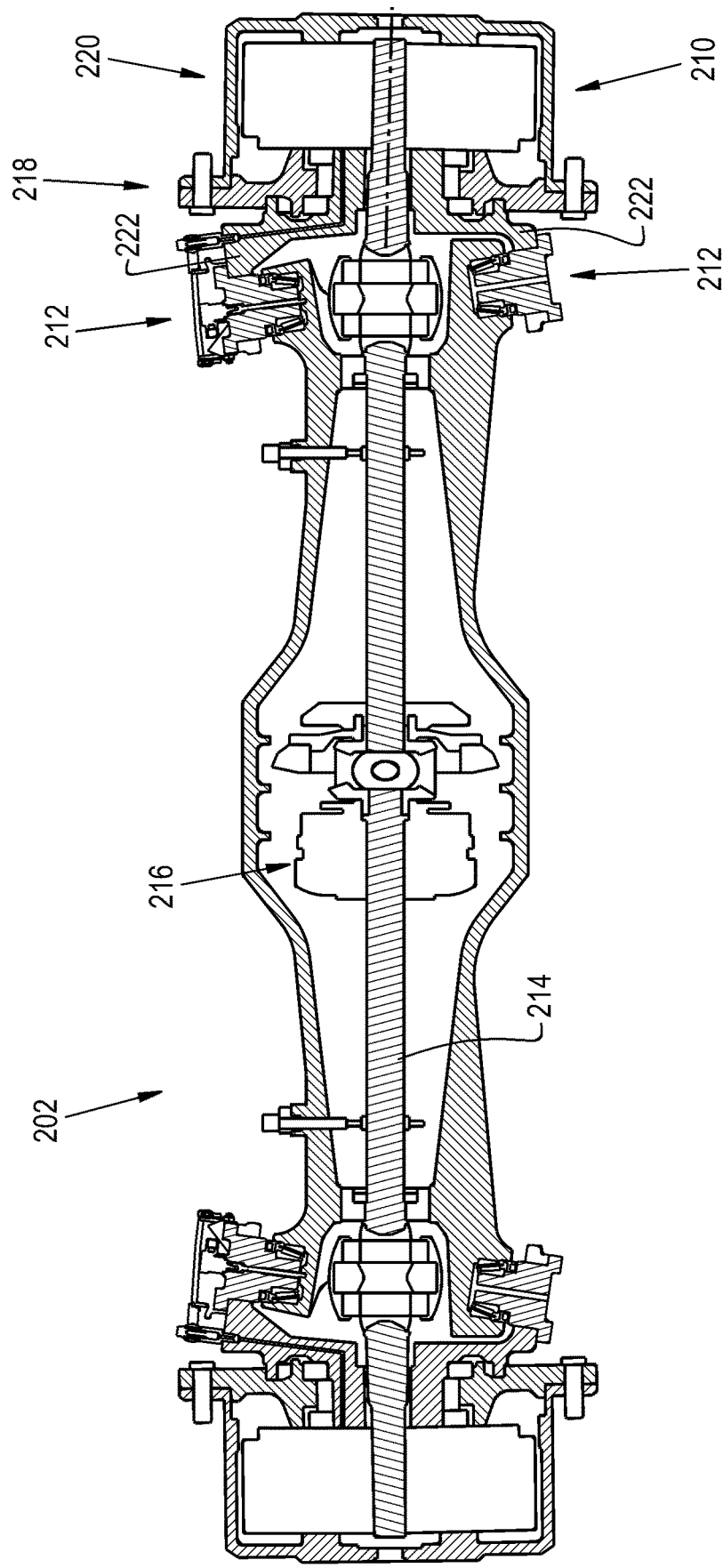
FIG. 4 shows the A-A' cross section of the front axle assembly of FIG. 3, according to an embodiment of the present invention.

FIG. 4 shows the A-A' cross section of the front axle assembly 202 of FIG. 3, according to an embodiment of the invention. As illustrated, the front axle assembly 202 includes a front drive shaft 214 and a differential 216 for transferring power from a main draft shaft (not shown) to the front drive shaft 214 for driving the wheels 204 (FIG. 2), each connected its respective wheel assembly 210. Furthermore, the wheel assembly 210 typically includes a wheel flange assembly 218 and a final drive assembly 220, although in another embodiment of the invention, the final drive assembly 220 is not included. The front drive shaft 214, the differential 216, the wheel flange assembly 218 and the final drive assembly 220 are well known in the art, and thus will not be discussed in any further detail. As illustrated, the steering sensor pin assembly 212 is coupled to the wheel flange assembly 218 via a steering knuckle 222. Although the front axle assembly 202 shows four steering sensor pin assemblies 212 (i.e., two assemblies 212 associated with each wheel assembly 210), the scope of the invention covers the wheel assembly 210 having only one steering sensor pin assembly 212.

Figure 5:
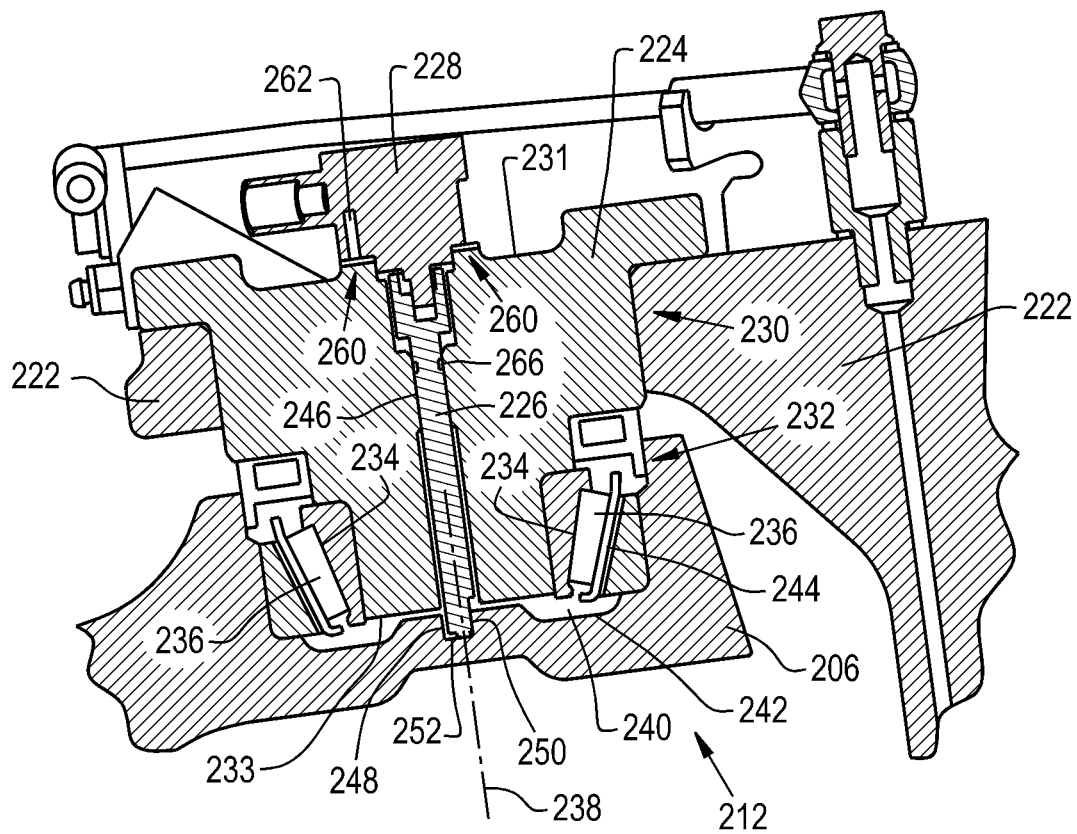
FIG. 5 shows the steering sensor pin assembly of FIG. 4, according to an embodiment of the present invention.

FIG. 5 shows the steering sensor pin assembly 212 of FIG. 4, according to an embodiment of the invention. The steering sensor pin assembly 212 includes a kingpin 224, a steering sensor pin 226, and a steering sensor 228. The kingpin 224 includes a top portion 230 having a top surface 231 and a bottom portion 232 having a bottom surface 233 and a bottom portion side surface 234. The bottom portion 232 has a tapered roller bearing assembly 236 arranged circumferentially on the bottom portion side surface 234, thereby enabling the kingpin 224 to rotate about a longitudinal axis 238.

FIG. 6 shows the axle beam 206 of FIG. 5, according to an embodiment of the invention. As shown in FIG. 6 and FIG. 5, the axle beam 206 includes a beam opening 240 having a beam opening bottom surface 242 and a beam opening side surface 244.

Referring again to FIG. 5, the bottom portion 232 of the kingpin 224 is positioned in the beam opening 240. The top portion 230 of the kingpin 224 is connected to the steering knuckle 222. In embodiment of the invention, the top portion 230 of the kingpin 224 is connected to the steering knuckle 222 via fasteners, such as clamps, pins, bolts, screws, etc. (not shown). In another embodiment of the invention, the top portion 230 of the kingpin 224 is welded to the steering knuckle 222.

Furthermore, the kingpin 224 includes a hole 246 (also referred to as a through-hole) directed from the top surface 231 of the kingpin 224 to the bottom surface 233 of the kingpin 224. A slot 248 (FIG. 5 and FIG. 6) is formed in the beam opening bottom surface 242 of the axle beam 206. The slot 248 has a slot side surface 250 and a slot bottom surface 252. In one embodiment of the invention, the slot 248 is not formed through the axle beam 206, and the slot side surface 250 is thread-less (i.e., the slot side surface 250 is not threaded). Furthermore, the steering sensor pin assembly 212 is configured such that the hole 246 of the kingpin 224 is aligned with the slot 248 in the axle beam 206.

According to an embodiment of the invention, and as illustrated in FIG. 7, the steering sensor pin 226 has a first end 254 and a second end 256 opposite the first end 254. The second end 256 has a flat face 258 configured to couple with the slot 248 in the axle beam 206. In one embodiment of the invention, the steering sensor pin 226 is thread-less. Referring again to FIG. 5, the steering sensor pin 226 is positioned in the hole 246 such that the flat face 258 of the steering sensor pin 226 engages (i.e., couples) with the slot 248 in the axle beam 206 for coupling the kingpin 224 to the axle beam 206.

In another embodiment of the invention and referring again to FIG. 5, the steering sensor 228 is configured to connect with a region 260 of the top surface 231 of the kingpin 224 adjacent (e.g., circumferentially adjacent) the hole 246 via one or more fasteners 262, such as clamps, bolts, screws, pins, etc., for encapsulating the steering sensor pin 226 in the hole 246. The steering sensor pin 226 is thereby fixed from moving in the longitudinal direction 238 in the hole 246 by the steering sensor 228 positioned at the first end 254 of the steering sensor pin 226 and the slot bottom surface 252 contacting the second end 256 of the steering sensor pin 226. The steering sensor pin 226 is also fixed from rotating in the hole 246 by the coupling of the flat surface 258 of the pin 226 with the slot 248 of the axle beam 206. In one embodiment of the invention, the steering sensor pin 226 is configured with a notch 264 (FIG. 7) for seating an O-ring 266 (FIG. 5) for preventing any lubricant located in the hole 246 from leaking out of the hole 246 in the direction of the steering sensor 228.

In another embodiment of the invention, the tie rod 208 (FIG. 3) of the front axle assembly 202 is coupled to the steering knuckle 222 (FIG. 3) for rotating the steering knuckle 222, including the connected kingpin 224 and the steering sensor 228, about the steering sensor pin 226 via the tapered roller bearing assembly 236. Upon an operator turning a steering wheel (not shown), which is mechanically coupled to the tie rod 208, the steering sensor 228 is configured to generate an electrical signal based upon an angle of rotation of the steering sensor 228 about the steering sensor pin 226. FIG. 8 depicts a view looking down the hole 246 along the longitudinal axis 238 showing the angle of rotation between the steering sensor 228 and the steering sensor pin 226. In one embodiment of the invention, the angle of rotation θ of the steering sensor 228 about the steering sensor pin 226 is measured with respect to a reference line 268 that is normal to the flat face 258 of the steering sensor pin 226 and a steering sensor reference line 270 that is fixed with respect to manufacture of the steering sensor 228.

Since the steering sensor pin 226 can only be fitted into the slot 248 of the axle beam 206 in one particular orientation, and since the steering sensor 228 is configured to be connected to the top surface 231 of the kingpin 224 in one particular orientation, an aspect of the present invention provides a less complex and less time consuming manner of manufacturing and/or replacing the steering sensor pin assembly 212, including initializing (i.e., calibrating) the steering sensor 228 to indicate the correct angle of rotation between the steering sensor 228 and the steering sensor pin 226 (i.e., to indicate the correct angle of rotation of a steering wheel by an operator and/or the amount of rotation of the wheel 204 when the operator turns the steering wheel).

Furthermore, since the slot 248 in the axle beam 206 has a slot bottom surface 252 (i.e., the slot 248 does not provide a hole through the axle beam 206), pin lubricant cannot leak downward and out of the hole 246 through the axle beam 206, in contrast to a convention axle beam having a threaded hole formed through the axle for receiving a threaded steering sensor pin. In addition, since the steering sensor pin assembly 212 of the present invention does not use a lock nut, which is used in a conventional steering sensor pin assembly to securely lock the threaded steering sensor pin to the axle beam, the steering sensor pin assembly 212 of the present invention includes fewer components, thereby making manufacture more economical.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural vehicle comprising:
 a front axle assembly including an axle beam, said axle beam including a slot;
 a wheel assembly including a steering knuckle and a wheel flange assembly, said steering knuckle coupled to said wheel flange assembly; and
 a steering sensor pin assembly including:
 a steering sensor pin having a first end and a second end opposite said first end, wherein said second end has a flat face;
 a kingpin connected to said steering knuckle, said kingpin having a top surface, a bottom surface, and a hole from said top surface to said bottom surface, said hole aligned with said slot in said axle beam, and wherein said steering sensor pin is positioned in said hole for coupling said kingpin to said axle beam via said flat face of said steering sensor pin coupled with said slot.

2. The agricultural vehicle according to claim 1, wherein said slot is formed in said axle beam, said slot having a slot side surface and a slot bottom surface.

3. The agricultural vehicle according to claim 2, wherein said slot side surface is thread-less.

4. The agricultural vehicle according to claim 1, wherein said steering sensor pin is thread-less.

5. The agricultural vehicle according to claim 1, wherein said steering sensor pin is configured with a notch, said steering sensor pin including an O-ring seated in said notch.

6. The agricultural vehicle according to claim 1, wherein said steering sensor pin assembly further comprises a steering sensor, and wherein said steering sensor is connected to a region of said top surface circumferentially adjacent to said hole for encapsulating said steering sensor pin in said hole.

7. The agricultural vehicle according to claim 6, wherein said kingpin further comprises a top portion including said top surface and a bottom portion including said bottom surface, said bottom portion further including a bottom portion side surface and a tapered roller bearing assembly arranged circumferentially on said bottom portion side surface, wherein said axle beam has an opening having an opening bottom surface and an opening side surface, wherein said slot is formed in said opening bottom surface, and wherein said bottom portion of said kingpin is positioned in said opening such that said tapered roller bearing assembly contacts said opening side surface of said axle beam for enabling rotation of said kingpin, said connected steering sensor and said connected steering knuckle about said steering sensor pin.

8. The agricultural vehicle according to claim 7, wherein said steering sensor is configured to generate an electrical signal based upon an angle of rotation of said steering sensor about said steering sensor pin.

9. The agricultural vehicle according to claim 8, wherein said angle of rotation of said steering sensor about said steering sensor pin is measured with respect to a reference line that is normal to said flat face of said steering sensor pin.

10. The agricultural vehicle according to claim 7, wherein said top portion of said kingpin is connected to said steering knuckle.

11. The agricultural vehicle according to claim 10, wherein said top portion of said kingpin is connected to said steering knuckle via fasteners or welds.

12. The agricultural vehicle according to claim 7, wherein said front axle assembly further comprises at least one tie rod, and wherein said at least one tie rod is coupled to said steering knuckle for rotating said steering knuckle, said connected kingpin and said connected steering sensor about said steering sensor pin.

13. The agricultural vehicle according to claim 1, wherein the agricultural vehicle is a tractor.

* * * * *